United States Patent [19]

Iwamatsu et al.

[11] Patent Number: 4,907,016

[45] Date of Patent: Mar. 6, 1990

[54] RECORDING HEAD FOR USE IN AN ELECTRICALLY EXCITED TRANSFER RECORDING DEVICE

[75] Inventors: Tadashi Iwamatsu, Tenri; Shunji Nakai, Moriguchi; Hiroyuki Sawai, Nara; Shigemi Asai, Nara; Tetsuro Toyoshima, Nara, all of Japan

[73] Assignee: Sharp Kabushiki Kaisha, Osaka, Japan

[21] Appl. No.: 182,450

[22] Filed: Apr. 18, 1988

[30] Foreign Application Priority Data

Apr. 20, 1987 [JP] Japan ................................ 62-97219
May 22, 1987 [JP] Japan ................................ 62-126439
May 22, 1987 [JP] Japan ................................ 62-126440

[51] Int. Cl.[4] ............................................ G01D 15/10
[52] U.S. Cl. ................................ 346/76 PH; 219/216
[58] Field of Search .................... 346/76 PH; 219/216

[56] References Cited

U.S. PATENT DOCUMENTS 4,651,168 3/1987 Terajima et al. ............... 346/76 PH

*Primary Examiner*—B. A. Reynolds
*Assistant Examiner*—Gerald E. Preston
*Attorney, Agent, or Firm*—Birch, Stewart, Kolasch & Birch

[57] ABSTRACT

In an electrically excited transfer recording device which transfers an image or images formed in a recording film onto a recording chart, a recording head is comprised of a head base of resin having insulating properties and a plurality of electrode needles formed on the head base. During the printing, a resistance layer formed in the recording film is electrically charged by the electrode needles and ink contained in the recording film is fused upon generation of heat in the resistance layer to be transferred onto the recording chart.

4 Claims, 3 Drawing Sheets

RECORDING HEAD FOR USE IN AN ELECTRICALLY EXCITED TRANSFER RECORDING DEVICE

BACKGROUND OF THE INVENTION

1. Field of the Invention

The present invention generally relates to a recording head for use in an electrically excited transfer recording device, and more particularly, to the structure of a recording head for use in a transfer recording device of the type in which the transfer is executed by utilizing heat generated by electricity.

2. Description of the Prior Art

In an electrically excited transfer recording device, a resistance layer formed in a recording film is charged with electricity by a plurality of electrode needles provided in a recording head, thereby generating heat so that ink contained in the recording film is fused by the heat and transferred onto a recording chart.

FIG. 1 depicts an end portion of one of the conventional recording heads. The recording head, generally shown by 15, is comprised of an insulating head base 16 and a plurality of electrode needles 17 disposed on the surface of the head base 6. A recording film 18 having an ink layer therein, a conductive layer and a resistance layer is pressed against a recording chart 19 by the recording head 15, with the recording chart 19 being carried by a platen 20. The recording head 15 is then charged with electricity while sliding with respect to the recording film 18. Upon generation of heat in the resistance layer, the ink contained in the ink layer is fused so that an image or images formed in the recording film 18 may be transferred onto the recording chart 19.

In this way, since the recording head 15 slides with respect to the resistance layer of the recording film 18, the resistance layer partly comes off or peels off the recording film 18 due to the heat generated by mutual friction, the electricity or the like. The resistance layer which has peeled off turns to film waste, film refuse or the like and is caused to adhere to the end portion of the recording head 15 during printing operation. Upon repeated printing operation, the film waste gradually accumulates and lowers the quality of printed image. The sliding movement between the recording head 15 and the recording film 18 wears the end portion of the recording head 15, and therefore, a length A of contact gradually increases, within which the recording film 18 is pressed against the recording chart 19. As this length A of contact increases, the pressure between the recording film 18 and the recording head 15 decreases, thus resulting in unstable contact between the recording head 15 and the recording film 18. This fact occasionally lowers the transfer properties of the ink or deteriorates the quality of the printed image.

Conventionally, certain hard ceramics such as forstelite or the like are occasionally used in the head base 16 of the recording head 15 having on its surface a plurality of electrode needles 17. In such a construction, the film waste can hardly be removed and the quality of the printed image is undesirably lowered before long. Because of this, should the occasion arise, the end portion of the recording head 15 is lapped by a grinding sheet or the like so that any particles or waste material adhering thereto may be removed for improvement of the quality of the printed image. Such work, however, consumes much time and is not only inconvenient for the user, but results in increased cost during the use of the recording device.

Furthermore, from a manufacturing aspect, the formation of a pattern of the electrode needles with respect to the hard ceramic, firing process or the like required therefor disadvantageously cost a lot.

In the case of the head base 16 employing resinous material, the sliding movement between the recording head 15 and the recording film 18 wears the end portion of the recording head 15 by a considerable amount. The length A of contact, therefore, increases relatively rapidly and the transfer properties are deteriorated before long, thus resulting in the shortened life of the recording head 15. Furthermore, the increase of the length A of contact increases the area of contact and lowers the pressure between the recording head 15 and the recording film 18. Accordingly, since it becomes troublesome to remove the film waste and the amount of adhesion or accumulation thereof, increases, the quality of the printed image tends to be deteriorate.

SUMMARY OF THE INVENTION

Accordingly, the present invention has been developed with a view to substantially eliminating the above described disadvantages inherent in the prior art recording head for use in an electrically excited transfer recording device, and has for its essential object to provide an improved recording head in which the quality of printed image can be desirably stably kept for a long period.

Another important object of the present invention is to provide a recording head of the above described type which is simple in construction and stable in functioning, and can be manufactured at a low cost.

In accomplishing these and other objects, a recording head according to one preferred embodiment of the present invention is brought into contact at its end portion with a recording film, with the end portion being of a construction as shown by either one of the following:

(1) the end portion is chamfered in the rear thereof from an edge of the surface of contact between the recording head and the recording film;

(2) a plurality of grooves are formed in the rear of the end portion in a direction parallel to the electrode needles; or (3) the end portion is of a construction obtained by the combination of (1) and (2).

As the material of a head base constituting the main body of the recording head, resin having insulating properties, for example, polyimide, polyamide, polyphenylenesulfide, or ceramic, for example, Photoveel (name used in trade and manufactured by Photon Ceramics Co., Ltd.), forstelite, alumina or the like are employed.

Moreover, the recording head is chamfered at its end portion or of a construction in which a plurality of grooves are formed in the end portion. Because of this, the increase of the length of contact between the recording head and the recording film or the increase of the area of contact therebetween is relatively small. This fact restricts the deterioration of the transfer properties of the ink, the adhesion or the accumulation of the film waste onto the recording head so that the life of the recording head can be prolonged.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become more apparent from the following description taken in conjunction with the preferred embodiment thereof with reference to the accompanying drawings, which are given by way of illustration only, and thus not limitative of the present invention and throughout which like parts are designated by like reference numerals, and in which.

DETAILED DESCRIPTION OF THE PREFERRED EMBODIMENT

Figure 2:
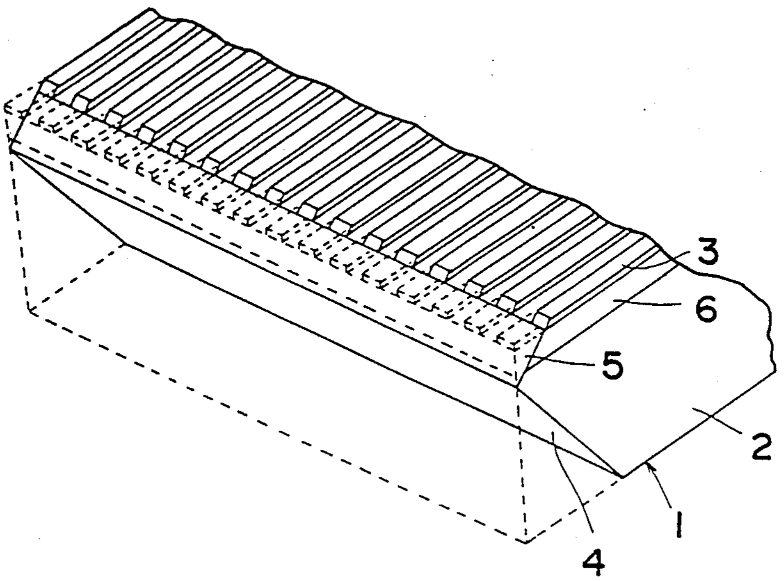
FIG. 2 is a fragmentary perspective view of an end portion of the recording head according to a first embodiment of the present invention.
Figure 3:
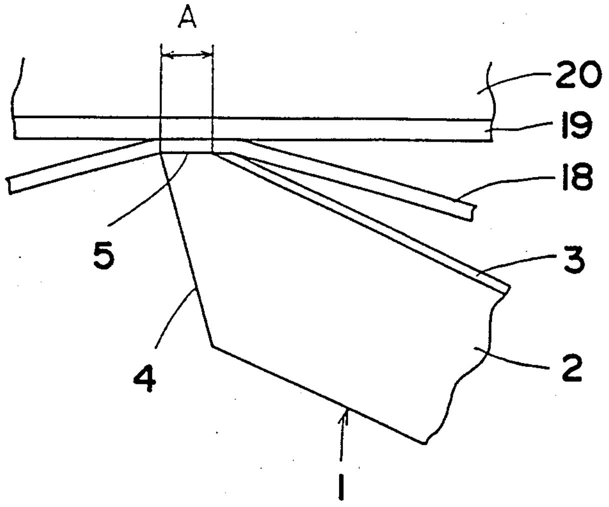
FIG. 3 is a side view of the end portion of the recording head of FIG. 2 during the printing.

Referring first to FIGS. 2 and 3, a recording head 1 according to a first embodiment of the present invention is comprised of an insulating head base 2 and a large number of electrode needles 3 disposed on the surface of the head base 2. The head base 2 is of an insulating base which is approximately 1 mm thick and mainly composed of polyimide resin, phenol resin or the like. An end portion of the head base 2 is chamfered in the rear thereof at an angle of 45 degrees. That is, upon removal of a portion shown by dotted lines in FIG. 2, a chamfered portion 4 is formed in the rear of the recording head 2. The chamfered portion 4 extends from one edge of a contact surface 5 between the recording head 2 and the recording film 18 to be formed at the end portion of the recording head 2. A heat-resisting insulating layer 6 of polyimide resin having a thickness of 50 μm is formed on the upper surface of the head base 2. The electrode needles 3 mainly composed of tungsten are each approximately 50 μm wide and formed on the insulating layer 6 at intervals of 106 μm.

Figure 4:
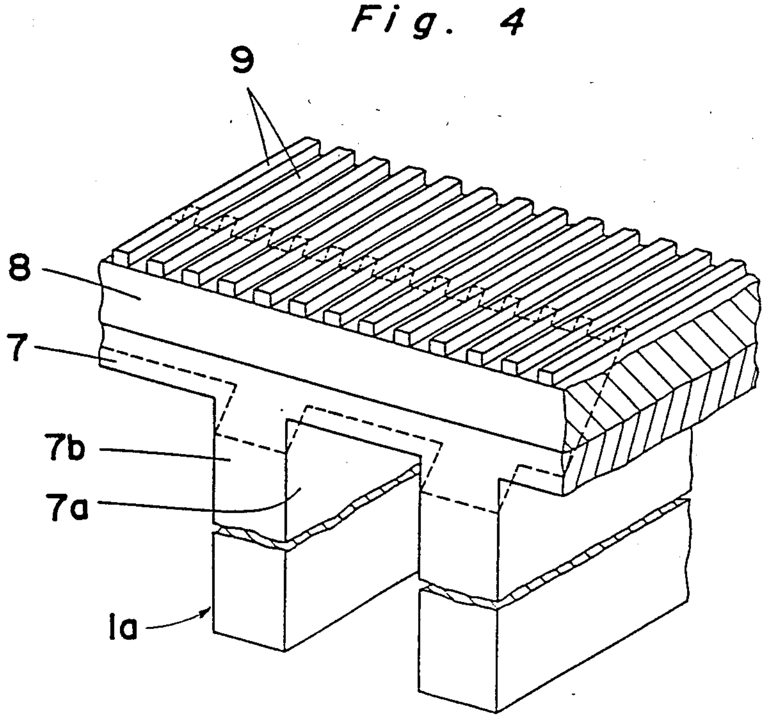
FIG. 4 is a fragmentary perspective view of the end portion of the recording head according to a second embodiment of the present invention.

FIG. 4 illustrates the end portion of the recording head 1*a* according to a second embodiment of the present invention.

The recording head 1*a* is comprised of an insulting head base 7, a heat-resisting insulating layer 8 and a plurality of electrode needles 9, as in the first embodiment. The material of these components 7, 8 and 9 of the recording head 1*a* are the same as that used in the first embodiment, and also, the electrode needles 9 are quite the same both in size and in arrangement as those of the first embodiment.

In this embodiment, however, a plurality of grooves 7*a* extending in a direction longitudinally of the recording head 1*a* and having a suitable depth are formed in the rear of the end portion of the head base 7 and between each of the adjacent ribs 7*b*. Each groove 7*a* and each rib 7*b* are 0.8 mm and 0.2 mm wide, respectively.

Figure 5:
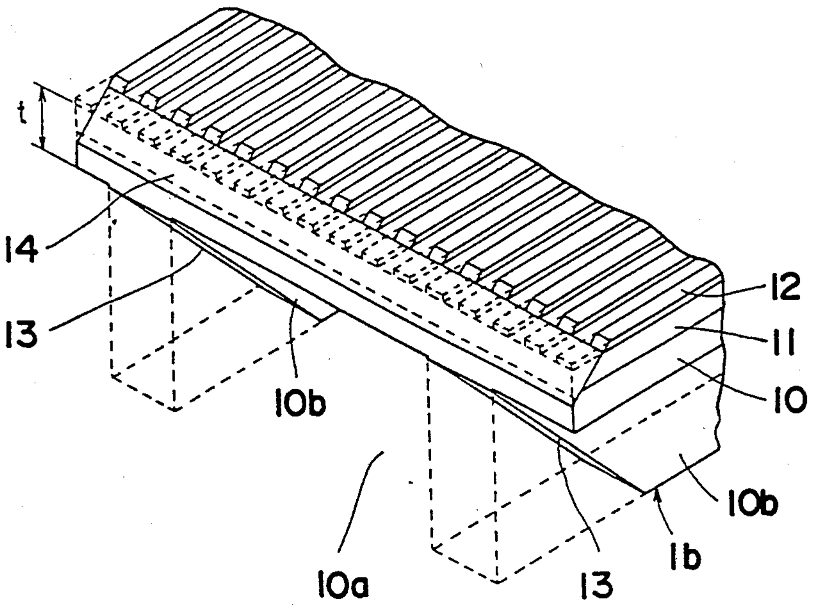
FIG. 5 is a fragmentary perspective view of the end portion of the recording head according to a third embodiment of the present invention.
Figure 6:
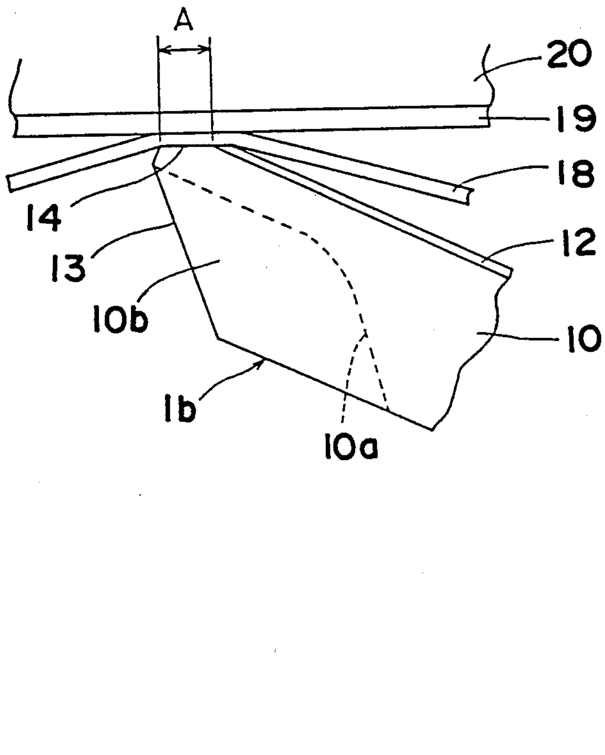
FIG. 6 is a side view of the end portion of the recording head of FIG. 5 during the printing.

FIGS. 5 and 6 illustrate the end portion of the recording head 1*b* according to a third embodiment of the present invention.

In this embodiment, the recording head 1*b* is comprised of an insulating head base 10, a heat-resisting insulating layer 11 and a plurality of electrode needles 12, as in the first and second embodiments. The material of these components 10, 11 and 12 of the recording head 1*b* are the same as that used in the first and second embodiments, and also, the electrode needles 12 are quite the same both in size and in arrangement as those of the first and second embodiments. A plurality of grooves 10*a* and ribs 10*b* having the same dimensions as those in the second embodiment have are alternately formed in the rear of the end portion of the head base 10. In this embodiment, however, the ribs 10*b* are chamfered at an angle of 45 degrees from the vicinity of an edge of the contact surface 14 between the end portion of the recording head 1*b* and the recording film 18. In other words, the chamfered portions 13 are formed in the rear of the end portion of the recording head 1*b* by removing corners of the ribs 10*b* as shown by dotted lines in FIG. 5.

Figure 1:
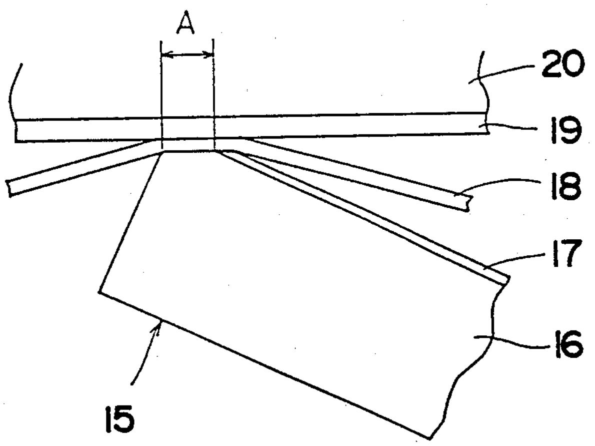
Fig. 1 PRIOR ART
FIG. 1 is a side view of an end portion of the conventional recording head during the printing.

Several experiments have been made with respect to the conventional recording head 15 of FIG. 1 having neither the grooves nor the chamfered portions and to the recording head 1, 1*a* or 1*b* of the present invention. The result of the experiments will be explained hereinafter.

With respect to the conventional recording head 15 having the head base 16 of a ceramic base of forstelite, the adhesion of the film waste has gradually lowered the quality of the printed image after the recording film 18 of about 100 m was used for the printing. In contrast, with respect to the conventional recording head 15 having the head base 16 of a resin base 16 of polyimide, the quality of the printed image has been lowered little even after about 6 km of the recording film was used for the printing. The printing followed by the use of 400 m of the recording film of has worn the end portion of the recording head 15 by an amount of $2.9/10^3$ $mm^3$ and $2.1/10^2$ $mm^3$ per 1 cm contact length of the recording head 15, respectively with respect to the ceramic base 16 and to the resin base 16. That is to say, the recording head 15 having the resin base 16 wears by an amount approximately 10 times more than that having the ceramic base, and therefore, the end portion of the recording head 15 is considered to be continuously ground. This fact is greatly effective against the adhesion of the film waste or the accumulation thereof.

The experiments have further been made with the use of the polyimide resin base with respect to four kinds of recording heads: the conventional one on which no processing is executed, the one of the chamfered construction according to the first embodiment, the one having therein the grooves according to the second embodiment, and the one of the chambered construction having therein the grooves according to the third embodiment.

In the conventional recording head 15 having the end portion on which no processing has been executed, after about 7 km of the recording film has been consumed by the printing, the transfer properties of the ink are lowered due to the increase of the contact length A between the recording head 15 and the recording film 18.

In the recording head 1 according to the first embodiment, the rate of increase of the contact length A is relatively small with respect to the same amount, of wear and approximately 10 km of the recording film 18 has been consumed by the printing until the transfer properties of the ink has been found to be lowered.

In the recording head 1*a* according to the second embodiment, since the contact length A at locations where the grooves 10*a* are formed does not exceed a certain length determined by the thickness t (FIG. 5) of the base 10 in which the ribs 10*b* and the grooves 10*a* are alternately formed, the transfer properties of the ink are never lowered. However, an area of a portion of the recording head 1*a* in contact with the recording film 18 increases with the progress of wear and the quality of the printed image is lowered, since the film waste is caused to increasingly adhere to the end portion of the recording head 1*a* and accumulates thereon. This phenomenon has become conspicuous upon consumption of about 13 km of the recording film 18.

In the recording head 1*b* according to the third embodiment, the contact length A does not increase so much with respect to the same amount of wear. In this case, about 20 km of recording film 18 has been used for the printing until the quality of the printed image has been found to be lowered.

As is clear from the above described experiments, the recording head 1*b* according to the third embodiment can be used for the printing with respect to the longest recording film 18.

As described above, according to the present invention, the resin having the insulating properties is utilized as the material of the head base constituting the recording head for use in the electrically excited transfer recording device. Furthermore, the chamfered portion is formed in the rear of the end portion of the head base from the vicinity of an edge of the contact surface between the recording head and the recording film. Alternatively, a plurality of grooves may be formed in the rear of the head base in a direction longitudinally of the recording head regardless of the presence of the chamfered portion.

The recording head of the present invention can, therefore, reduce the adhesion or the accumulation of the film waste onto the end portion of the recording head, and it is hard to lower the quality of the printed image. The resin base having such characteristics is fully utilized in the recording head of the present invention and is of advantage in remarkably saving time or trouble during the maintenance by using the grinding sheet or the like. Moreover, the grooves formed in the rear of the recording head can prevent a change for the worse in transfer properties caused by the increase of the contact length between the recording head and the recording film so that the life of the recording head may be prolonged. In addition, the chamfer processing can limit the increase of the contact length or area and make a contribution to the prolonged life of the recording head.

It is to be noted here that although the ceramic of forstelite, alumina or the like is disadvantageous in resistance to wear or in processing properties as compared with the resin base, this fact never denies the utilization of all of the ceramic base. It is needless to say that, in various kinds of ceramics, the one to which the film waste hardly adheres or the one having the resistance to wear or the processing properties similar to that of the resin is applicable to the present invention.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A recording head for use in an electrically excited transfer recording device which transfers an image or images formed in a recording film onto a recording chart as said recording film travels past said recording head, said recording head comprising:

a head base;

a plurality of electrode needles formed on said head base; and means for accommodating wear of said recording head due to the recording film travelling thereover where by substantial increase in contact area of the recording head with the recording film is prevented, the means for accommodating wear comprises an end portion of said recording head being chamfered at the area of contact between said recording head and said recording film to a bottom surface of the head base, said means for accommodating further comprises a plurality of grooves defined in the rear of at least said end portion of said head base in a direction generally parallel to the direction in which said electrode needles extend, said chamfered end portion and grooves reducing an amount of the recording head which contacts the recording film as the recording head wears in response to contact with the travelling recording film, whereby a resistance layer formed in the recording film is electrically charged by said electrode needles and ink contained in the recording film is fused upon generation of heat in said resistance layer to be transferred onto the recording chart and whereby a clean printing on the recording chart can be maintained even after extended use of the recording head.

2. The recording head as claimed in claim 1, wherein the end portion has a generally flat and uninterrupted surface in both a longitudinal and transverse direction.

3. The recording head as claimed in claim 1, wherein the end portion has a generally straight surface from the edge of the area of contact between the recording head and the recording film to the bottom surface of the head base.

4. The recording head as claimed in claim 1, wherein the end portion has at least two surfaces meeting at an obtuse angle, said at least two surfaces extend from the edge of the area of contact between the recording head and the recording film to the bottom surface of the head base at least when said recording head is installed in said electrically excited transfer recording device.

* * * * *